(12) United States Patent
Bodmer et al.

(10) Patent No.: US 9,726,559 B2
(45) Date of Patent: Aug. 8, 2017

(54) LOAD CELL FOR WEIGHT MEASUREMENT

(71) Applicant: Bizerba GmbH & Co. KG, Balingen (DE)

(72) Inventors: Benjamin Bodmer, Balingen (DE); Frank Metzger, Albstadt (DE); Klaus Müller, Hechingen (DE)

(73) Assignee: Bizerba SE & Co. KG (DE)

( * ) Notice: Subject to any disclaimer, the term of this patent is extended or adjusted under 35 U.S.C. 154(b) by 0 days.

(21) Appl. No.: 14/824,253

(22) Filed: Aug. 12, 2015

(65) Prior Publication Data

US 2016/0047702 A1    Feb. 18, 2016

(30) Foreign Application Priority Data

Aug. 15, 2014 (DE) ........................ 10 2014 111 682

(51) Int. Cl.
*G01L 1/26* (2006.01)
*G01G 21/24* (2006.01)
*G01G 23/00* (2006.01)

(52) U.S. Cl.
CPC .............. *G01L 1/26* (2013.01); *G01G 21/244* (2013.01); *G01G 23/005* (2013.01)

(58) Field of Classification Search
CPC ..... G01L 1/22; G01L 1/26; G01L 9/00; G01L 3/00; G01G 23/00; G01G 21/244
USPC .................................................... 73/862.639
See application file for complete search history.

(56) References Cited

U.S. PATENT DOCUMENTS

| 4,467,661 A | * | 8/1984 | Somal ...................... G01G 3/12 177/229 |
| 4,734,671 A | * | 3/1988 | Eisele ...................... G01L 9/006 338/2 |
| 5,923,000 A | * | 7/1999 | Tschopp ............... G01G 23/005 177/154 |
| 6,755,087 B2 | | 6/2004 | Clegg |

(Continued)

FOREIGN PATENT DOCUMENTS

| DE | 10-2004027619 A1 | 1/2006 |
| DE | 102006050228 B3 | 6/2008 |
| EP | 0251175 A2 | 1/1988 |

(Continued)

OTHER PUBLICATIONS

European Search Report; EP 15 17 9287, mailed Nov. 23, 2015.

*Primary Examiner* — Lisa Caputo
*Assistant Examiner* — Octavia Hollington
(74) *Attorney, Agent, or Firm* — Lerner, David, Littenberg, Krumholz & Mentlik, LLP

(57) ABSTRACT

The invention relates to a load cell for weight measurement with a load beam which has an overload protection.
In order to achieve a cost-effective manufacture, it is provided that the overload protection has a bar, running parallel to the center plane of the load beam, which freely engages in a recess on the movable force application side of the load beam, with the result that there is an upper and a lower air gap between the bar and the force application side. In the case of an overload, the upper or the lower air gap is bridged and the force application side comes to rest against the bar, with the result that no further movement of the force application side relative to the stationary side of the load cell is possible.

19 Claims, 2 Drawing Sheets

(56) References Cited

U.S. PATENT DOCUMENTS 9,164,004 B2 * 10/2015 Schmittner .............. G01G 3/12

FOREIGN PATENT DOCUMENTS

| FR | 2 490 342 A1 | 3/1982 |
|----|--------------|--------|
| JP | S56 19730 U  | 2/1981 |

* cited by examiner

LOAD CELL FOR WEIGHT MEASUREMENT

CROSS REFERENCE TO RELATED APPLICATIONS

The present application claims priority from Germany Application No. DE 102014111682.8 filed in the German Patent Office on Aug. 15, 2014, the disclosure of which is incorporated herein by reference.

FIELD

The invention relates to a load cell for weight measurement according to the features of the present disclosure.

BACKGROUND

In practice it is necessary, in the case of load cells, to provide an overload protection in order to prevent destruction of the load cell if the load is too high.

An overload protection for a load receptor of a load cell is known from DE 10 2004 027 619 B4. The load cell shown has two parallelogram links which are arranged in a load beam and are formed by recesses arranged underneath the parallelogram links. Between the recesses, a limiting element is arranged which has a narrow, end-face pin which engages in a recess of the movable part of the load beam. The pin has a concave contour which is adapted to round alignment pins. The alignment pins are inserted into a receiver arranged on the movable part of the load receptor and secured there. The diameter of the alignment pins determines the free path of the movable part of the load receptor. This load beam is relatively expensive to produce because it is necessary to adapt the dimensions of the alignment pins and the outer contour of the pin to each other very precisely and only very small tolerances are admissible during assembly.

EP 0 251 175 A2 shows a load receptor of a load cell which has four through holes transverse to its longitudinal extension. These four through holes are connected to each other by slots. A slot extending in the force application direction has a contour which extends transverse to the force application direction in sections. Because of the contour extending transverse to the force application direction, this slot represents an overload protection. During the production of this load beam it is necessary to form relatively long thin slots which are allowed to have only a very small tolerance. This load beam is therefore relatively expensive to manufacture in terms of production.

U.S. Pat. No. 6,755,087 B2 shows a load receptor of a load cell which likewise has four recesses which are aligned transverse to the longitudinal extension of the load receptor. These four recesses are again also connected to each other via slots. These slots likewise extend over a very long distance, with the result that this load beam is also relatively expensive to produce.

SUMMARY

An object of the present invention is to develop a load cell for weight measurement which can be produced simply and cost-effectively and has a reliable overload protection.

This object is achieved according to the invention with a subject-matter according to the features of the present disclosure.

According to the invention it is provided that the load beam has an overload protection which has a bar, running parallel to the center plane, which separates the first recess from the second recess and the outer sides of which, running parallel to the center plane of the load beam, are designed rectilinear, wherein the bar either is connected firmly to the ground side with one of its ends and, with its other, end-face end, freely engages in a material-free area arranged on the force application side, with the result that in the neutral position between the outer sides of the bar running parallel to the center plane and the force application side in each case an upper and a lower air gap is arranged, or is connected firmly to the force application side with one of its ends and, with its other, end-face end, freely engages in a material-free area arranged on the ground side, with the result that in the neutral position between the outer sides of the bar running parallel to the center plane and the ground side in each case an upper and a lower air gap is arranged, and the upper and lower air gaps open into a third recess, arranged in the area of the end-face end of the bar, which has a round contour. The round contour of the third recess can be formed, for example, as an elliptical or circular contour.

In particular it can also be provided that the outer sides of the bar running parallel to the center plane extend beyond the deformation area, or beyond the dimensions of the first recess and second recess running in the longitudinal direction of the bar. In particular the deformation area, in respect of its expansion in the longitudinal direction of the bar, can be defined by the dimensions of the first recess and/or of the second recess running in the longitudinal direction of the bar.

It is advantageous, in the case of the solution according to the invention, for the upper and lower air gaps to extend only over a relatively short distance. Further, both the upper air gap and the lower air gap are formed running rectilinearly. The manufacturing outlay for producing these slots or air gaps to be manufactured with small tolerances therefore proves to be relatively small. The third recess which connects the upper air gap to the lower air gap can be manufactured by a cost-effective manufacturing method, for example by milling or drilling or another machining method.

Further, in one embodiment according to the invention it can be provided that the load beam has a stationary ground side at one of its ends and a force application side that can be moved in the force application direction at its opposite end, wherein the force application side is connected to the ground side via a deformation area which has two parallelogram links, running parallel to each other and spaced apart from each other in the force application direction, which are arranged parallel to the center plane of the load beam running transverse to the force application direction and wherein in the deformation area a material-free first recess and a material-free second recess are arranged lying one above the other in the force application direction and the first recess and the second recess are in each case designed directly adjoining a parallelogram link, wherein the load beam has an overload protection which comprises a bar, running parallel to the center plane, the outer sides of which, running parallel to the center plane, are designed rectilinear, and the bar either: is connected firmly to the ground side with one of its ends and, with its other, end-face end, freely engages in a material-free area arranged between the first recess and between the second recess, with the result that in the neutral position between the outer sides of the bar running parallel to the center plane and the force application side in each case an upper air gap and a lower air gap is arranged, or: is connected firmly to the force application side with one of its ends and, with its other, end-face end, freely engages in a material-free area arranged between the first recess and between the second recess, with the result that in the neutral position between the outer sides of the bar running parallel to the center plane and the ground side in each case an upper air gap and a lower air gap is arranged, and the upper air gap and the lower air gap open into a third recess, arranged in the area of the end-face end of the bar, which has a round contour.

It is preferably provided that the upper air gap and the lower air gap are designed as relatively thin slots. The upper air gap and the lower air gap are in particular arranged between the bar and the force application side or the ground side. The dimensions of these slots, in particular their width and/or their length, determine the freely movable section of the force application side.

In the neutral position the load cell or the load beam is unloaded. This means that the upper parallelogram link and the lower parallelogram link are arranged, in the neutral position, parallel to the outer sides and parallel to the center plane of the load beam. If the load beam is loaded with a force, the force application side veers relative to the ground side in the direction of the action of force, thus in the force application direction. The parallelogram links thereby deform in the deformation area. This deformation can be detected via sensors.

The bar arranged in the center plane of the load beam is in particular arranged or formed such that it continues to remain aligned parallel to the center plane despite the loading of the load beam. This is brought about for example by arranging the bar in the area of the center plane of the load beam or arranging the center plane inside the bar. The bar thus preferably comprises a neutral line of the load beam and does not deform when the load beam is loaded. However, as the bar engages in a recess on the force application side and this force application side moves relative to the ground side, during a weight measurement the distance between the bar and the force application side, and thus the width of the upper or lower air gap, changes. If the weight to be measured becomes correspondingly high, the upper air gap is bridged and the force application side comes to rest directly against an outer contour of the bar. A further movement of the force application side is now effectively prevented by the bar, even if the weight increases further.

The ground side of the load beam is designed stationary and can be connected firmly to a set of scales, in particular screwed to a housing or a frame of a set of scales. The force application side of the load beam is freely movable relative to the ground side in the force application direction. A deformation area which has parallelogram links is arranged between the ground side and the force application side. An upper first parallelogram link and a lower second parallelogram link connect the ground side to the force application side. The length of the parallelogram links defines a deformation area, wherein sensors for measuring a deformation can be attached in the deformation area. These sensors can be formed as strain gauges or according to the principle of a vibrating string.

The force application direction of the load cell runs substantially perpendicular to the center plane of the load beam. The force application direction forms, in a manner of speaking, a normal to the center plane of the load beam.

The parallelogram links are arranged spaced apart from each other and in each case run in a plane which, seen in the force application direction, runs above or underneath the center plane of the load cell.

The load beam can be formed from a rectangular box-shaped, in particular single-piece block. The load beam can in particular be formed from a metal alloy, for example an aluminum alloy or a steel alloy.

In one embodiment it is provided that in each case recesses are arranged one above the other in the force application direction in the deformation area of the load beam between the parallelogram links and the center plane of the load beam. The recesses are designed directly adjoining a parallelogram link. The first recess lying on top, seen in the force application direction, is separated from the second recess, which is lower seen in the force application direction, by a bar.

In one design it is preferably provided that the bar is formed symmetrical in respect of the center plane of the load beam, in particular that the bar has a plane of symmetry which is arranged transverse to the force application direction between the first and the second recess. The plane of symmetry of the bar can coincide with the center plane of the load beam.

For a simplified machining it can further be provided that the first recess and the second recess are formed symmetrical in respect of the center plane of the load beam.

In one design it can be provided that the extension or the inner width of the first recess and of the second recess in the force application direction is larger than the extension or the thickness of the bar in the force application direction.

A simple manufacture of the load cell can be achieved by forming the bar in a single piece with the load beam. In an alternative embodiment the bar can also be designed as a separate part which is connected, preferably screwed or riveted, either to the force application side or to the ground side.

A simple manufacture of the load beam has the result, as it can be provided in one embodiment, that the extension or the inner width of the first recess and of the second recess in the force application direction is larger than the extension or the thickness of the bar in the force application direction.

It is provided in particular that the outer contour of the bar has a straight contour, in particular running parallel to the center plane of the load beam, and that the diameter of the round contour of the third recess in the force application direction is at least as large, preferably is exactly as large, as the distance of the first recess from the second recess. The diameter of the round contour of the third recess in the force application direction is preferably dimensioned exactly as large as the distance of the first recess from the second recess plus the width of the first air gap and of the second air gap. It is thereby possible for the course of the upper air gap and of the lower air gap likewise to be able to be designed parallel to the center plane of the load beam. Thus, in a structurally simple manner, the upper air gap or the lower air gap can be designed parallel to the outer contour of the bar and preferably parallel to the center plane of the load beam.

In one embodiment it can be provided for example that the height of the bar in the force application direction lies in the range between 7 mm and 25 mm, preferably lies between 10 mm and 16 mm, particularly preferably is 13 mm. Accordingly, the diameter of the third recess in the force application direction can lie in the range between 8 mm and 26 mm, preferably lies between 11 mm and 17 mm, particularly preferably is 14 mm. The diameter of the third recess is designed enlarged by the width of the air gaps relative to the height of the bar. The width of the upper air gap and/or of the lower air gap can lie in the range between 0.25 mm and 1.5 mm, can preferably lie between 0.4 and 0.8 mm, can particularly preferably be 0.5 mm. The length of the upper air gap and of the lower air gap can lie in the range of from 5 mm to 25 mm, can preferably lie between 7 mm and 25 mm, can particularly preferably be 10 mm.

Further, it can be provided that the center point of the third recess lies in the center plane of the load beam.

In one embodiment it is provided that the expansion of the deformation area is determined by the length of the parallelogram links. In particular the deformation area is defined by the extension of the first recess or of the second recess in the longitudinal direction of the load beam. In particular it can be provided that the extension of the bar in the longitudinal direction of the load beam extends beyond the deformation area. The extension of the bar in the longitudinal direction of the load beam is preferably larger than the extension of the first recess and/or of the second recess in the longitudinal direction of the load beam.

A particularly cost-effective production of the load beam is achieved by producing the first and/or the second recess by machining, in particular by milling or drilling.

Likewise the third recess can be produced by machining, in particular by drilling or milling.

A particularly cost-effective and in the process precise and reliable production method results if the upper air gap and the lower air gap are produced by eroding, in particular wire cutting or electrical discharge machining.

In order to adapt the load cell or the load beam to different weight ranges it can be provided that the maximum path of the movable force application side relative to the ground side is set by the width of the first and/or of the second air gap.

Likewise it can be provided that the maximum path of the movable force application side relative to the ground side can be set by the distance of the third recess in the longitudinal direction of the load beam to the first and/or the second recess and/or that the maximum path of the movable force application side relative to the ground side can be set by the length of the first slot and/or of the second slot.

A use of the load cell according to the invention can take place for example in a set of scales which is used in the sale of fresh food. Through the cost-effective and precise production method it is also possible to use the load cell according to the invention in industrial scales, for example in checkweighers or dosing scales.

The invention is now explained in more detail with reference to embodiment examples. There are shown in:

DETAILED DESCRIPTION

Figure 1:
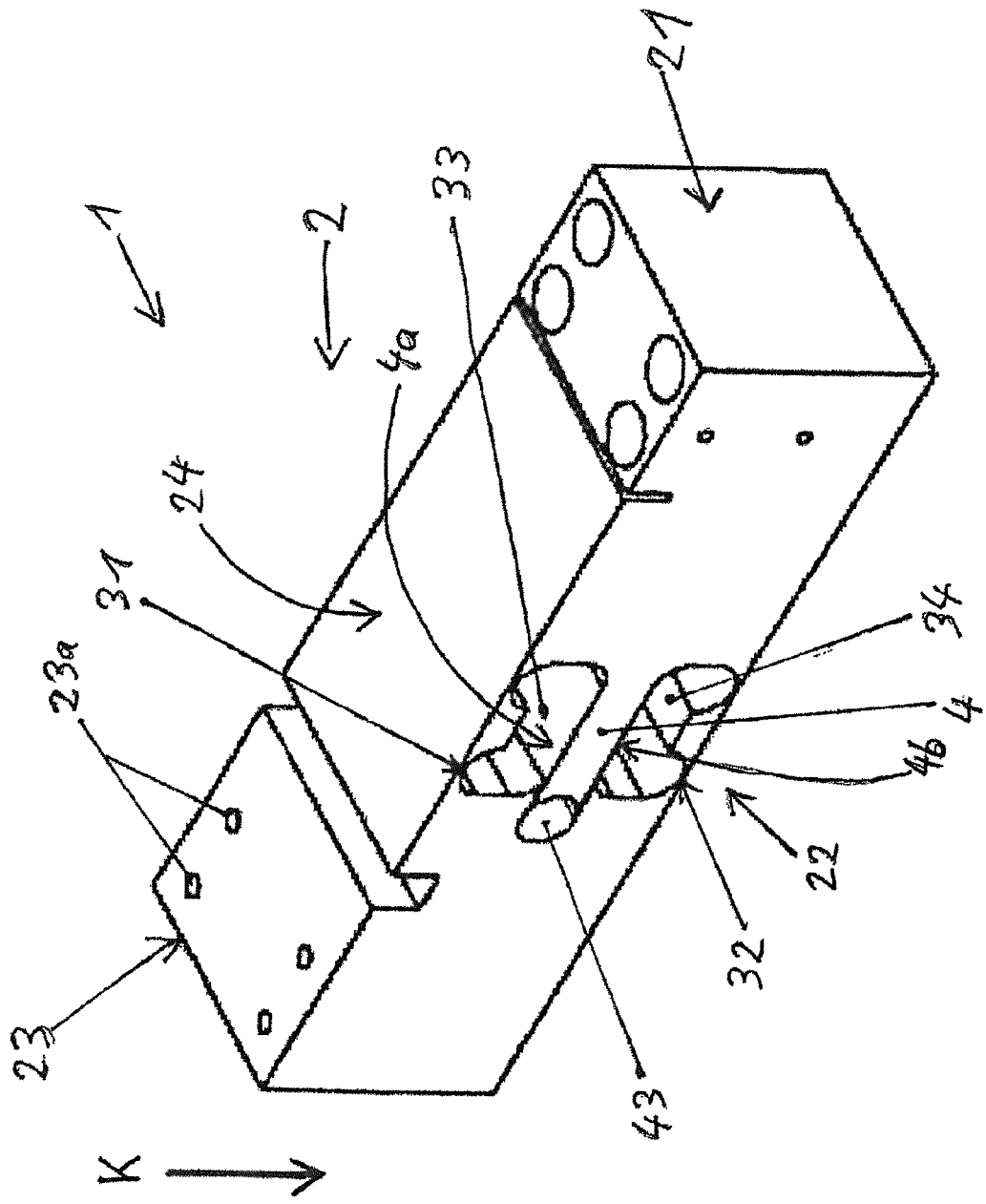
FIG. 1: a schematic representation of the load cell in perspective view.
Figure 2:
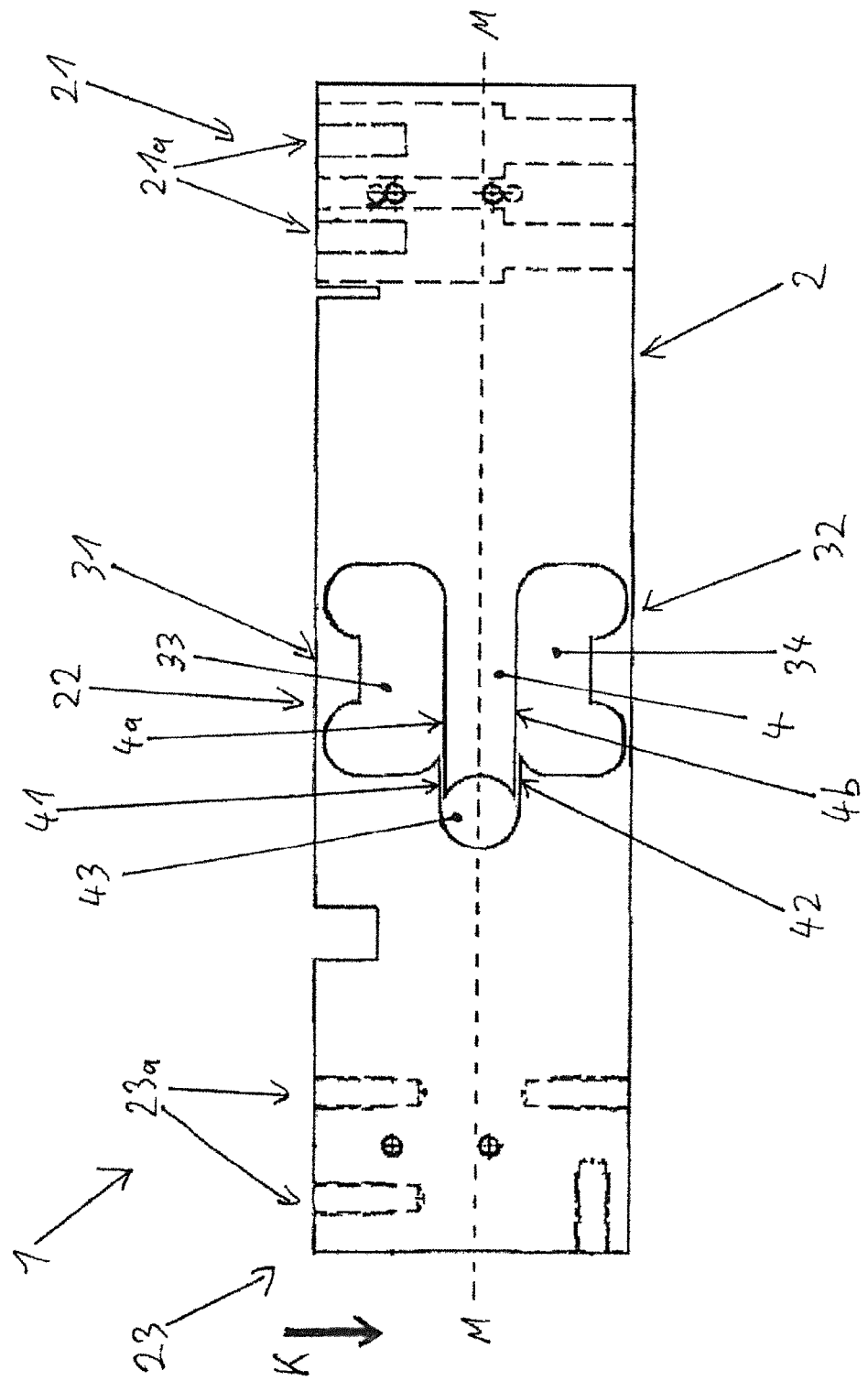
FIG. 2: a schematic representation of the load cell in side view.

The two FIGS. 1 and 2 show a load cell 1 with a rectangular box-shaped load beam 2. The rectangular box-shaped load beam 2 is designed as a monolithic load beam and is produced from a solid block, e.g. an aluminum block. The load beam 2 has three areas along its longitudinal extension. A first stationary area is formed by the ground side 21. In this area, as represented in FIG. 2, receiver openings 21a are provided, to which the load beam 2 can be firmly screwed in a set of scales or in a frame of a set of scales.

The force application side 23 is arranged at the end of the load beam 2 opposite the ground side 21. In the area of the force application side 23 receiver openings 23a are provided, via which the load beam 2 can be connected to a load-receiving tray. A deformation area 22 is arranged between the ground side 21 and the force application side 23. The deformation area 22 is formed by material-free first and second recesses which run transverse to the longitudinal extension of the load beam 2. The recesses create weakening zones which make a calculable deformation of the load beam 2 possible.

A first recess 33 is arranged in the upper area of the load beam 2. A second recess 34 is arranged in the lower area of the load beam 2. A center plane which is outlined in FIG. 2 by the dashed line M-M runs in the center of the load beam 2. The force application direction K which is represented in FIGS. 1 and 2 by an arrow running perpendicular runs perpendicular to the center plane M-M of the load beam 2.

The recesses 33 and 34 are carved out of the block used as starting material by drilling or milling. They run transverse to the longitudinal extension of the load beam 2 and extend over its entire width. Parallelogram links are arranged above or underneath the recesses 33 and 34. The parallelogram links 31 and 32 are formed by the first recess 33 and the second recess 34. The upper parallelogram link 31 and the lower parallelogram link 32 form a parallelogram link assembly which makes a targeted shear movement of the force application side 23 relative to the ground side 21 possible.

In order to limit the path of the shear movement, with the result that even in the case of high load no remaining plastic deformations of or damage to the load beam 2 develop, an overload protection is provided. The overload protection comprises a bar 4 which is arranged in the central area between the upper recess 33 and the lower recess 34. The upper outer contour 4a of the bar 4 forms a limitation or boundary surface of the upper recess 33. The lower outer contour 4b of the bar 4 forms a limitation or boundary surface of the lower recess 34.

The bar 4 extends from the ground side 21 beyond the deformation area 22 into a recess on the movable force application area 23. In each case an air gap 41 or 42 is arranged above or underneath the bar 4 in the force application area 23. The upper air gap 41 extends rectilinearly from the upper recess 33 to a third recess 43 which is arranged on the end face of the bar 4. The third recess 43 extends transverse to the longitudinal extension of the load beam 2 and runs over its entire width. The third recess 43 has a circular contour. The center point of the third recess 43 lies in the center plane M-M, as represented in FIG. 2.

In FIG. 1 and in FIG. 2 in each case the unloaded neutral position of the load beam 2 is represented. When the load beam is loaded by means of a weight force along the vector K the force application side 23 veers downwards. As the bar 4 runs in the center plane of the load beam 2 and is connected firmly to the ground side, the bar 4 does not participate in this shear movement. During the shear movement in the force application direction K the distance of the upper air gap 41 is reduced. The further the force application side 23 veers, the smaller the upper air gap 41 becomes. From a certain weight value, which corresponds to the maximum allowable shear movement of the force application side 23, the air gap 41 disappears and the bar 4 comes to rest directly against the force application side 23. From this point the bar 4 supports the force application side 23, with the result that a further shear movement of the force application side 23 is no longer possible.

A deformation is brought about in the deformation area 22 by the shear movement of the force application side 23. This deformation is detected via sensors. The sensors are applied to a sensor application surface 24 which runs on the upper side of the load beam 2, as represented in FIG. 1. For example strain gauge sensors which emit a measurement signal which has a functional connection to the deflection of the force application side 23 can be applied, in particular adhered, to this sensor application surface 24.

The load cell 1 comprises, in addition to the load beam 2 and the sensors, not represented in the figures for the sake of clarity, for force measurement, additionally also evaluation electronics, in particular an A/D converter, in order to process the measurement signals supplied by the sensors and to relay them to a superordinated evaluation device.

In the production of the load beam 2 it is provided that the first and second recesses 33 and 34 are first produced by machining, for example milling or drilling. Then the third recess 43 can be carved out of the load beam 2 by drilling or milling. The upper air gap 41 and the lower air gap 42 can then be produced subsequently by wire cutting. A connection of the first, upper recess 33 leading to the third recess 43 takes place through the upper air gap 41. In the same way, a connection of the second, lower recess 34 leading to the third recess 43 takes place through the lower air gap 42. The maximum path of the force application side 23 can be determined and or set in a targeted manner by the width of an air gap 41 or 42, or the length of the air gaps 41, 42.

The extension of the deformation area 22 in the longitudinal direction of the load beam 2 is determined by the length of the recesses 33 and 34 respectively. Above the recesses 33 and below the recess 34 respectively, the corresponding parallelogram link 31 or 32 is arranged in each case, which is deformed during a shear movement. The force application side 23 extends from one end of the load beam 2 up to the deformation area, or to the nearest end of the upper parallelogram link 31 and/or of the lower parallelogram link 32. The ground side 21 extends from the other end of the load beam 2 to the deformation area 22 or to the end of the upper parallelogram link 31 and/or of the lower parallelogram link 32 nearest to the ground side. The end of the parallelogram links 31, 32 is determined by the dimensions of the material-free first and second recesses 33 and 34 respectively. In the design represented in FIG. 2 both recesses 33 and 34 have, on the left-hand and on the right-hand side, in each case a perpendicularly running contour, which contours lie one above the other in a straight line and cover each other. The extension of the deformation area 22 in the longitudinal direction of the load beam 2 is defined by these perpendicularly running contours of the recesses 33 and 34.

LIST OF REFERENCE NUMBERS

1 Load cell
2 Load beam
21 Ground side
21a Securing openings
22 Deformation area
23 Force application side
23a Load application receivers
24 Sensor application area
31 First (upper) parallelogram link
32 Second (lower) parallelogram link
33 First recess (top)
34 Second recess (bottom)
4 Bar
4a First outer side
4b Second outer side
41 First (upper) air gap
42 Second (lower) air gap
43 Third recess
K Force application direction
M-M Center plane

The invention claimed is:

1. Load cell for weight measurement comprising:
a load beam which has a stationary ground side at one end thereof and a force application side that can be moved in a force application direction at an opposite end thereof, wherein the force application side is connected to the ground side via a deformation area which has two parallelogram links, running parallel to each other and spaced apart from each other in the force application direction, which are arranged parallel to a center plane of the load beam running transverse to the force application direction and wherein in the deformation area a material-free first recess and a material-free second recess are arranged lying one above the other in the force application direction and the first recess and the second recess are in each case designed directly adjoining a parallelogram link,
wherein the load beam has an overload protection which comprises a bar, running parallel to the center plane, which separates the first recess from the second recess and the outer sides of which, running parallel to the center plane, are designed rectilinear, and the bar either
a) is connected firmly to the ground side with one end thereof and, with another end-face end thereof, freely engages in a material-free area arranged on the force application side, with the result that in a neutral position between the outer sides of the bar running parallel to the center plane and the force application side respectively an upper air gap and a lower air gap are arranged, or
b) is connected firmly to the force application side with the one end thereof and, with the another end-face end thereof, freely engages in a material-free area arranged on the ground side, with the result that in the neutral position between the outer sides of the bar running parallel to the center plane and the ground side respectively the upper air gap and the lower air gap are arranged,
and the upper air gap and the lower air gap open into a third recess, arranged in the area of the end-face end of the bar,
wherein the third recess has a round contour and the end-face end of the bar forms a section of the round contour.

2. The load cell according to claim 1,
wherein the outer sides of the bar running parallel to the center plane extend beyond the deformation area.

3. The load cell according to claim 1,
wherein the bar has a plane of symmetry which is arranged transverse to the force application direction between the first and the second recesses.

4. The load cell according to claim 3,
wherein the plane of symmetry of the bar coincides with the center plane of the load beam.

5. The load cell according to claim 1
wherein the first recess and the second recess are formed symmetrical in respect of the center plane of the load beam.

6. The load cell according to claim 1,
wherein an extension or inner width of the first recess and of the second recess in the force application direction is larger than an extension or thickness of the bar in the force application direction.

7. The load cell according to claim 1,
wherein a diameter of the round contour of the third recess in the force application direction is at least as large as a distance between the first recess and the second recess.

8. The load cell according to claim 1,
wherein a center point of the third recess lies in the center plane of the load beam.

9. The load cell according to claim 1,
wherein at least one of the upper air gap or the lower air gap runs rectilinearly and parallel to the center plane of the load beam.

10. The load cell according to claim 1,
wherein an extension of the bar in the longitudinal direction of the load beam is larger than an extension of at least one of the first recess or the second recess in the longitudinal direction of the load beam.

11. The load cell according to claim 1,
wherein at least one of width or length of the upper air gap or at least one of width or length of the lower air gap limits a bending movement or shear movement of the load beam in the case of an overload.

12. A method for producing the load cell according to claim 1,
wherein at least one of the first recess or the second recess is produced by machining.

13. The method according to claim 12,
wherein the third recess is produced by machining.

14. The method according to claim 12,
wherein the upper air gap and the lower air gap are produced by eroding.

15. The method according to claim 12,
wherein a maximum path of the force application side relative to the ground side is set by width of at least one of the upper air gap or the lower air gap.

16. The method according to claim 12,
wherein at least one of
 (i) a maximum path of the force application side relative to the ground side is set by a distance of the third recess, in the longitudinal direction of the load beam, to at least one of the first recess or the second recess, or
 (ii) the maximum path of the movable force application side relative to the ground side is set by length of at least one of the upper air gap or the lower air gap.

17. The method of claim 12, wherein the machining by milling or drilling.

18. The method of claim 13, wherein the machining of the third recess is by milling or drilling.

19. The method of claim 14, wherein the eroding is by wire cutting or electrical discharge machining.

* * * * *